United States Patent
Lee et al.

(10) Patent No.: US 9,078,139 B2
(45) Date of Patent: Jul. 7, 2015

(54) METHOD FOR ACQUIRING INFORMATION IN A COEXISTENCE SYSTEM, AND APPARATUS USING SAME

(75) Inventors: Jihyun Lee, Gyeonggi-Do (KR);
Eunsun Kim, Gyeonggi-Do (KR);
Yongho Seok, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 13/575,565

(22) PCT Filed: Oct. 31, 2011

(86) PCT No.: PCT/KR2011/008178
§ 371 (c)(1),
(2), (4) Date: Jul. 26, 2012

(87) PCT Pub. No.: WO2012/057584
PCT Pub. Date: May 3, 2012

(65) Prior Publication Data
US 2012/0304213 A1    Nov. 29, 2012

Related U.S. Application Data

(60) Provisional application No. 61/408,644, filed on Oct. 31, 2010, provisional application No. 61/421,217, filed on Dec. 9, 2010.

(51) Int. Cl.
*H04W 16/14* (2009.01)
*H04N 21/2385* (2011.01)
(Continued)

(52) U.S. Cl.
CPC .......... *H04W 16/14* (2013.01); *H04N 21/2385* (2013.01); *H04W 24/04* (2013.01); *H04W 72/042* (2013.01); *H04W 72/085* (2013.01)

(58) Field of Classification Search
CPC ..................... H04W 16/14; H04N 21/2385
USPC ................. 370/329, 337; 455/452.1
See application file for complete search history.

(56) References Cited

U.S. PATENT DOCUMENTS

2001/0003214 A1*  6/2001  Shastri et al. ............. 725/109
2003/0169697 A1   9/2003  Suzuki et al.
(Continued)

FOREIGN PATENT DOCUMENTS

JP    2009-509380 A    3/2009
KR    10-2009-0005592 A    1/2009
(Continued)

*Primary Examiner* — Robert Hance
(74) *Attorney, Agent, or Firm* — Birch, Stewart, Kolasch & Birch, LLP

(57) ABSTRACT

A method for receiving a measurement report includes: transmitting, by an apparatus including a coexistence manager (CM), a measurement request message for acquiring a measurement report from at least one device that uses a channel in a TV band to a coexistence enabler (CE); and receiving, by the apparatus, a measurement response message including the result of the measurement results from the CE. The measurement request message includes a first element indicating which of a primary detection, a detection of a device that uses the TV band, and a channel load measurement is requested. The measurement request message includes at least one of a start frequency, an end frequency, a channel list, and a measurement time related to the measurement, and the measurement report includes at least one selected from among the result of primary detection, the result of the detection of the device that uses the TV band.

11 Claims, 15 Drawing Sheets

(51) Int. Cl.
*H04W 24/04* (2009.01)
*H04W 72/04* (2009.01)
*H04W 72/08* (2009.01)

(56) References Cited

U.S. PATENT DOCUMENTS

| | | | |
|---|---|---|---|
| 2008/0259811 A1* | 10/2008 | Cordeiro et al. | 370/252 |
| 2009/0197627 A1* | 8/2009 | Kuffner et al. | 455/522 |
| 2009/0221286 A1 | 9/2009 | Kim et al. | |
| 2009/0252051 A1 | 10/2009 | Yu et al. | |
| 2010/0097950 A1 | 4/2010 | Jeon | |
| 2010/0309806 A1* | 12/2010 | Wu et al. | 370/252 |
| 2011/0307612 A1* | 12/2011 | Junell et al. | 709/226 |
| 2012/0057533 A1* | 3/2012 | Junell et al. | 370/329 |
| 2012/0058790 A1* | 3/2012 | Junell et al. | 455/509 |
| 2012/0108179 A1* | 5/2012 | Kasslin et al. | 455/67.13 |

FOREIGN PATENT DOCUMENTS

| | | |
|---|---|---|
| KR | 10-2009-0087178 A | 8/2009 |
| KR | 10-2009-0091798 A | 8/2009 |
| KR | 10-2009-0105304 A | 10/2009 |
| WO | WO 2007/031956 A2 | 3/2007 |
| WO | WO 2010/117998 A2 | 10/2010 |

* cited by examiner

FIG. 11

(a)
```
COEX_measurement.request (
         DestinatizzonIdentifier
         ChannelNumber
)
```

(b)
```
COEX_measurement.indication (
         SourceIdentifier
         ChannelNumber
)
```

(c)
```
COEX_measurement.response (
         DestinationIdentifier
         ResultCode
         Measurement Report Set
)
```

(d)
```
COEX_measurement. confirm(
         SourceIdentifier
         ResultCode
         Measurement Report Set
)
```

METHOD FOR ACQUIRING INFORMATION IN A COEXISTENCE SYSTEM, AND APPARATUS USING SAME

This application is the National Phase of PCT/KR2011/008178 filed on Oct. 31, 2011, which claims priority under 35 U.S.C. 119(e) to U.S. Provisional Application No. 61/408,644 filed on Oct. 31, 2010 and U.S. Provisional Application No. 61/421,217 filed on Dec. 9, 2010, all of which are hereby expressly incorporated by reference into the present application.

TECHNICAL FIELD

The present invention relates to a method for acquiring information in a coexistence system and an apparatus using the same.

BACKGROUND ART

Conventionally, allotment of frequency for a new service or allotment of frequency to new service providers was led by the government.

In particular, when new corners enter, the government allots a new frequency to them through an auction, or the like, or collects an existing frequency from an existing service provider and re-deploys it to a different service provider, thereby allotting frequency as limited resource.

However, recently, as demand for wireless data traffic is explosively increased in the wake of the spreading of various wireless Internet-based applications such as open terminal platform, App store, mobile VoIP, and the like, the government-driven frequency allotment is considered very ineffective and it is increasingly difficult to secure a new frequency on a table of frequency allocation fundamentally.

In particular, in line with the rapid growth of broadcast and communication systems, next-generation communication systems have been designed in a converged form of several networks and increasingly complicated, and the necessity of interaction or interworking is extending. Also, development of communication technologies and services has increased the frequency of use in frequency resources and the occupancy of a particular frequency band in a fixed manner to provide excellent communication techniques and services has caused severe depletion of frequency Recently, a frequency sharing scheme has come to prominence as a solution to the problems. This starts from a point of view that the current frequency shortage phenomenon is resulted from an existing partition type frequency management scheme and, although frequency appears to be insufficient on the table of frequency allocation but such frequency shortage can be solved through a sharing scheme.

As the depletion of frequency resources has been admitted to be significant worldwide, FCC (Federal Communications Commission) to the US decided to apply a cognitive radio technology, a frequency sharing technology, to a TV white space and revised a relevant regulation.

Such a movement is gradually extending, and in 2009, England has permitted the use of a CR (Cognitive Radio)-based frequency sharing technology in a band, included in a TV broadcast band, which is not spatially used, namely, a white space band. EU is discussing the introduction of the CR-based frequency sharing technology, and, also domestically, preparations for a frequency sharing policy using the white space band are being made.

The CR technology refers to a system in which a communication device observes a communication environment by itself, determines and selects an operation scheme for optimum communication, and makes a plan for a future determination process from a previous communication experience. Namely, the CR technology locates idle resource (spectrum hole, white space) which has low utilization or is temporally/spatially not used among frequency bands allocated to unlicensed band, and adaptively and opportunistically uses it. In this case, when a primary user having a license for a corresponding band is discovered, the use of the corresponding band should be stopped or transmit power is adjusted not to cause damage to the primary user.

DISCLOSURE

Technical Problem

An embodiment disclosed in the present disclosure is directed to reducing signaling and computation overhead by measuring a channel load, when a coexistence manager performs an optimal operational channel allocation while managing every information including measurement information.

An embodiment disclosed in the present disclosure is directed to allowing a TVBD network or device to inform a coexistence manager about preference with respect to an operational channel on the basis of channel information actually measured channel information by using a channel load, thereby reducing overhead with respect to channel allocation by the coexistence manager.

Technical Solution

According to an aspect of the present invention, there is provided a method for receiving a measurement report, including: transmitting, by an apparatus including a coexistence manager (CM), a measurement request message for acquiring a measurement report from at least one device that uses a channel in a TV band to a coexistence enabler (CE); and receiving, by the apparatus, a measurement response message including the result of the measurement results from the CE, wherein the measurement request message includes a first element indicating which of a primary detection, a detection of a device that uses the TV band, and a channel load measurement is requested, the measurement request message further includes at least one of a start frequency, an end frequency, a channel list, and a measurement time related to the measurement, and the measurement report includes at least one selected from among the result of primary detection, the result of the detection of the device that uses the TV band, and the result of the channel load measurement.

According to another aspect of the present invention, there is provided a method for transmitting a measurement report, including: receiving, by an apparatus including a coexistence enabler (CE), a measurement request message for acquiring a measurement report from at least one device that uses a channel in a TV band, from a coexistence manager (CM); and transmitting, by the apparatus, a measurement response message including the result of the measurement to the CM, wherein the measurement request message includes a first element indicating which of a primary detection, a detection of a device that uses the TV band, and a channel load measurement is requested, the measurement request message further includes at least one of a start frequency, an end frequency, a channel list, and a measurement time related to the measurement, and the measurement report includes at least one selected from among the result of primary detection, the result of the detection of the device that uses the TV band, and the result of the channel load measurement.

Advantageous Effects

According to an embodiment disclosed in the present disclosure, vulnerabilities of interference relationship between TVBD networks or devices calculated only by geo-locations and device types (a problem of acquiring a neighbor set between TVBD networks or devices) can be covered, and signaling and computation overhead in performing an optimal operational channel allocation while a coexistence manager manages every information including measurement information can be considerably reduced.

Also, According to another embodiment disclosed in the present disclosure, by informing a coexistence manger about preference for an operating channel based on channel information actually measured by a TVBD network or device, overhead with respect to a channel allocation of the coexistence manager can be significantly reduced.

DESCRIPTION OF DRAWINGS

FIG. 11(a) is a view illustrating semantics of a primitive of a coexistence measurement request according to an embodiment disclosed in the present disclosure.

FIG. 11(b) is a view illustrating semantics of a primitive of a coexistence measurement notification according to an embodiment disclosed in the present disclosure.

FIG. 11(c) is a view illustrating semantics of a primitive of a coexistence measurement response according to an embodiment disclosed in the present disclosure.

FIG. 11(d) is a view illustrating semantics of a primitive of a coexistence measurement confirmation according to an embodiment disclosed in the present disclosure.

MODES FOR INVENTION

Figure 1:
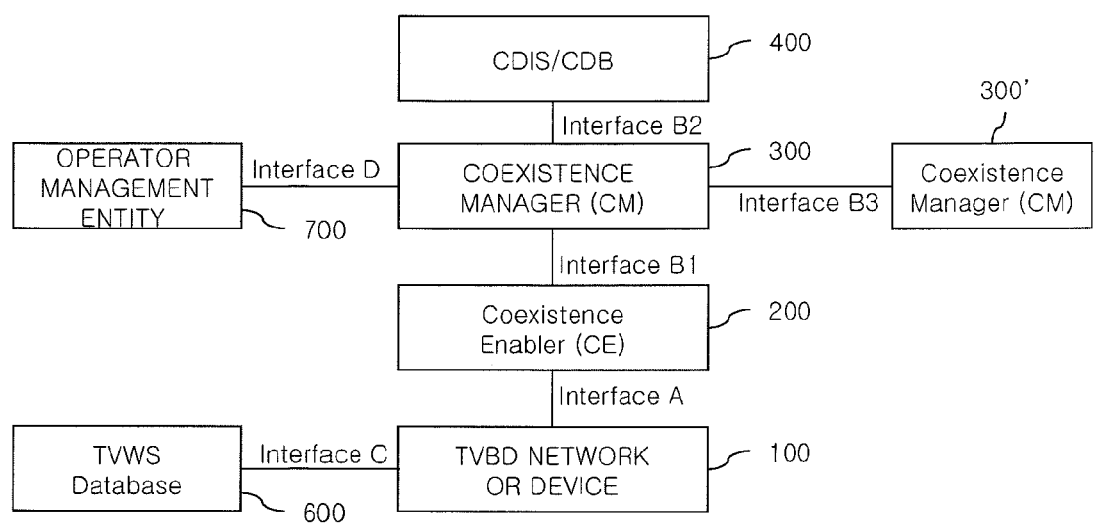
FIG. 1 is a schematic block diagram of a coexistence system according to an embodiment of the present disclosure.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

Hereinafter, a term of terminal is used, and the terminal may be called by other names such as UE (User Equipment), ME (Mobile Equipment), MS (Mobile Station), UT (User Terminal), SS (Subscriber Station), MSS (Mobile Subscriber Station), wireless device, handheld device, or AT (Access Terminal).

IEEE 802.11 wireless local area network (WLAN) standard provides a transfer rate of 54 Mbps (IEEE 802.11a) using an unlicensed band at 2.4 GHz or 5 GHz.

IEEE 802.11g provides a transfer rate of 54 Mbps by applying an orthogonal frequency-division multiplexing (OFDM) at 2.4 GHz.

IEEE 802.11n provides a transfer rate of 300 Mbps with respect to four spatial streams by applying MIMO-OFDM. IEEE 802.11n supports a channel bandwidth of up to 40 MHz, and in this case, it provides a transfer rate of 600 Mbps.

TV whitespace (TVWS) includes VHF bands (54~60, 76~88, 174~216 MHz) and a UHF band (470~698 MHz) allocated to a broadcast TV system. The TV whitespace refers to a licensed frequency band permitted to be used by an unlicensed device under the conditions that the unlicensed device does not hamper communication of a licensed device (a TV, a wireless microphone, or the like) operating at a corresponding frequency band.

Meanwhile, TVWS, an acronym of TV white space, refers to an empty frequency band not used by a broadcast provider at a VHF and UHF frequency band distributed for a TV broadcast, and also refers to an unlicensed band any one may use when conditions for a propagation regulation are met. Namely, the TV white space may refer to frequency information for broadcasting. In detail, spatially, TV white space refers to a band empted to avoid frequency interference between broadcast providers, a frequency band not used by area, or an area broadcasting propagation does not reach, and temporally, TV white space refers to an empty broadcast frequency in a time duration in which a broadcast provider does not transmit a broadcast at dawn. Broadcast reception by a TV viewer as a client of a broadcast provider should not be interfered with, and a wireless microphone device performing communication by a small output by using a portion of the band (TVWS) should not also be influenced.

At bands of 512~608 MHz and 614~698 MHz, every unlicensed devices, except for some particular cases, are permitted to operate, but bands of 54~60 MHz, 76~88 MHz, 174~216 MHz, and 470~512 MHz are permitted only for communication between fixed devices. A fixed device refers to a device that performs transmission only at a determined position.

An IEEE 802.11 TVWS terminal is an unlicensed device operating by using IEEE 802.11 MAC and PHY in a TV white space spectrum.

An unlicensed user who wants to use TV whitespace should provide a protection function with respect to a licensed user. Thus, before starting transmission in a TV band, whether or not a licensed user is occupying a corresponding band must be checked or ascertained To this end, the unlicensed device is connected to a geo-location database through the Internet or a dedicated network to acquire information regarding a list of channels which are available in a corresponding area. The geo-location database refers to a database storing and managing licensed devices registered thereto, location information of the licensed devices, and information regarding channels which are dynamically changed as devices use them over channel occupied time.

A station (STA) performs a spectrum sensing mechanism. Here, as the spectrum sensing mechanism, an energy detection scheme, a feature detection scheme, or the like, is utilized. When the strength of a reception signal is equal to or greater than a certain value or when a DTV preamble is detected, the station (STA) determines that an incumbent user is using a particular channel. When the station (STA) determines that an incumbent user is using a channel contiguous to a channel currently used by the STA or an access point (AP) connected to the STA, the STA and the AP should lower transmission power.

FIG. 1 is a schematic block diagram of a coexistence system according to an embodiment of the present disclosure. As shown in FIG. 1, a coexistence system according to an embodiment of the present disclosure includes a coexistence enabler (CE) 200, a coexistence manager (CM) 300, a coexistence discovery and information server (CDIS) or a coexistence database (CDB) 400.

The coexistence manager (CM) 300 and the coexistence enabler (CE) 200 are logical entities defined for allowing different wireless systems or different wireless service providers operating in an unlicensed state to coexist. The CM 300 is an object which provides a policy or a guideline in relation to coexistence allowing different systems and different service providers having an interface with respect to a TVWS database and operating in the TVWS to coexist, and allocates resources to solve an interface problem between coexistence enablers (CEs) 200 connected thereto.

The coexistence enabler (CE) 200 has an interface with respect to a television band device (TVBD) network or device 100 and serves to transfer information or a command received from the CM 300 to the TVBD network or device 100. In the present disclosure, the STAs may perform the function of the CE 200, and a coexistence network structure in which a management entity such as the CM 300 exists as a higher object that may be able to control the plurality of CEs 200 will be handled.

The CE 200 receives information or a command in relation to coexistence from the CM 300. The CE 200 converts the received information and command into information or a command in a media-specific format and transfers the converted information or command to the TVBD network or device 100 for an operation of the TVBD network or device 100 required by a corresponding message. Similarly, information received from the TVBD network or device 100 may be converted into a message format defined in the coexistence system by the CE 200 and the transmitted to the CM 300. Since the CE 200 is disposed within the TVBD network or device 100, a service access point (SAP) and a primitive with an entity for managing the TVBD network or device 100 should be defined in order to allow the information or command for coexistence to be transferred.

The CM 300 may serve one or more CEs 200. The CM 300 may acquire required information from an external entity such as the TVWS database, the CEs 200 served by the CM 300 itself, or another CM 300. The CM 300 may transmit and receive information or a command message to and from the different CM 300 or transmit information or a command to the CE 200 served by the CM 300 itself. The CM 300 makes a coexistence decision based on the acquired information. Here, decision on an operating channel of the CE 200 served by the CM 300, a maximum transmission power value, and the like, may be included in the decision.

The TVBD network or device 100 may be an unlicensed user who uses a TV band, or the TVBD network or device 100 may be a device or a network. For example, the TVBD network or device 100 may be a device, such as an access point (AP) or a base station (BS), operating in a master mode. The TVBD network or device 100, the AP, or the BS, operating in the master mode, may communicate with the CM 300 for coexistence and manage and/or control devices operating in a slave mode.

The CDIS 400, having an interface with respect to the CM 300, acquires information regarding the CM 300 served by the CDIS 400 and the CE 200 served by the corresponding CM 300, e.g., geo-location information of the TVBD network or device 100 served by the CE 200, available channel list information acquired by the TVBD network or device 100 from the TVWS database, measurement results of the TVBD network or device 100, a list of CEs 200 served by the CM 300, and the like, from the CM 300 and manages the acquired information.

The CDIS 400 may calculate a neighbor relationship between the CMs 300 served by the CDIS 400 and that between the CEs 200. Namely, based on a particular TVBD network or device 100, the CDIS 400 may calculate a certain TVBD network or device 100 which is in an interference relationship with the particular TVBD network or device 100 and a CE 200 and a CM 300 that serve the certain TVBD network or device 100.

In order to use the coexistence service, the CE 200 establishes a connection with the CM 300 and registers itself to the corresponding CM 300. In this case, the CM 300 should establish a connection with a neighboring CM 300. The CM 300 manages CEs 200 registered to the CM 300, and provides a service for coexistence. Such a topology in which the CM 300 manages a plurality of CEs 200 and makes a decision for coexistence is called a centralized topology. In the centralized topology, the CM 300 is a decision maker, so the CD 200 follows the decision made by the CM 300.

Hereinafter, each element of the coexistence system will be described in detail.

The CE 200 is connected to the CM 300 via an interface B1, the CM 300 is connected to the CDIS or CDB 400 via an interface B2, and the CM 300 is connected to another CM 200' via an interface B3.

Also, the CE 200 is connected with the TVBD network or device 100 through an interface A. Here, the TVBD network or device 100 refers to a terminal that is able to use TV white space in the US Federal Communication Commission (FCC). The TVBD network or device 100 may be connected with the TVWS database 600 through an interface C.

The CE 200 may request information required for coexistence from the TVBD network or device 100 and acquire the corresponding information, and switch a reconfiguration switching request/command and control information received from the CM 300 to a TVBD-specific reconfiguration request/command and transmit the same to the TVBD network or device 100.

In order to solve the coexistence problem between TVBD networks, the CM 300 may have a function of discovering different CMs, a coexistence decision function of generating corresponding coexistence request/command and control information and providing the generated coexistence request/command and control information to the CE 200, and a function of supporting exchanging of information required for coexistence between CMs (this may include hierarchical and/or peer-to-peer decision making capabilities in disposing CMs).

Also, the CM 300 may have a function of selecting a representative CM by sharing information regarding CMs, a function of generating a coexistence whitespace map for effectively sharing frequency resources between different networks (to be described) and between different systems, and a function of assisting network operators in performing management in relation to TVWS coexistence.

The CM 300 may be implemented in an embedded form in a device such as an AP or a BS or may be implemented outside a device.

The CDIS/CDB 400 may be represented by a CDIS or a CDB according to functions. The CDIS/CB 400 may have a function of generating a coexistence whitespace map or a coexistence map in order to effectively share frequency resources between different networks and between different systems, a function of controlling a plurality of operators in performing management in relation to TVWS coexistence, and a function of electing a representative CM in order to reduce overhead between CMs and solve a coexistence problem.

Also, the CDIS/CDB 400 may perform a function of calculating a coexistence contour in order to search for neighboring networks and/or systems, a function of redirecting the coexistence whitespace map or the coexistence map according to the TVBD in order to solve the coexistence problem, a function of supporting searching for CMs by accelerating opening of an interface between CMs, and a function of collecting, coordinating (i.e., synthesizing or generalizing), and providing information that may be able to promote coexistence (this function includes a data storing and data processing).

In allocating resources, the CDIS/CDB 400 may omnipotently distribute resources, present, as an intermediary, the reference of priority among the CMs 300 and fine-tune resource selection of the respective CMs 300, or act as an external and heterogeneous network medium for sharing information among the CMs 300.

Meanwhile, the interface A is an interface between the CE 200 and the TVBD network or device 100. Information required for coexistence, a request for configuration/information for coexistence, a configuration/measurement/information response for coexistence, and different information, as necessary, may be provided from the TVBD network or device 100. reconfiguration request/command and control information (which corresponds to coexistence request/command and control information received from a CM), a request/command in relation to controlling a measurement value performed by the TVBD network or device 100, information regarding available resource, and different information, as necessary, may be provided from the CD 200 to the TVBD network or device 100.

The interface B1 is an interface between the CE 200 and the CM 300. Information (information acquired from the TVBD network or device 100) required for coexistence and any other information, as necessary, may be provided from the CE 200 to the CM 300. Coexistence request/command and control information and any other information, as necessary, may be provided from the CM 300 to the CE 200.

The interface B2 is an interface between the CM 300 and the CDIS/CDB 400. Information required for a coexistence map, information required for a neighbor set, information required for registration or unenrollment, information required for searching (acquired by a currently used CM), information required for coexistence (acquired by the currently used CM), any other information as necessary, and the like, may be provided from the CM 300 to the CDIS/CDB 400.

From the CDIS/CDB 400 to the CM 300, information provided for coexistence map, information provided for a neighbor set (or a neighbor list), information provided for a representative CM, information required for searching (acquired by another CM), information required for coexistence (acquired by the different CM), and any other information as necessary, and the like, may be provided.

The interface B3 is an interface between the CM 300 and another CM 300'. From the CM 300 to another CM 300', information and a message required for searching and coexistence, information provided for registration/unregistration (from the CM to a representative CM or from a CM of a device to a CM of a server), information provided for a coexistence map (from the CM to a representative CM or from a CM of a server to a CM of a device), information required for policy exchange/negotiation, any other information as necessary, and the like, may be provided.

The interface C is an interface between the TVBD device 100 and the TVWS database 600. Information provided for an available channel may be provided from the TVWS database 600 to the TVBD network or device 100.

The interface D is an interface between the CM 300 and an operator management entity (OME) 700. Network operation information in relation to information (e.g., a limitation factor related to an operation of a spectrum policy/network) and any other information as necessary may be provided to the CM 300 through the interface D by the OME 700.

Figure 2:
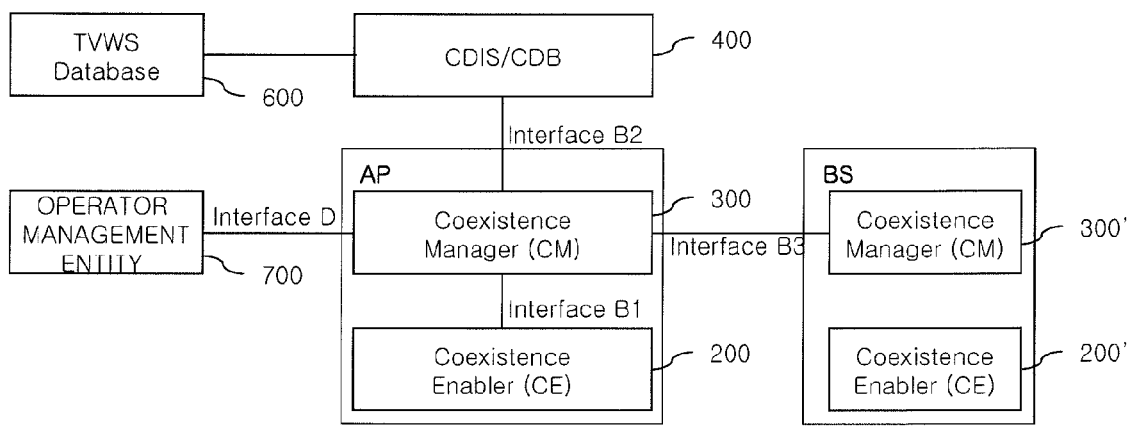
FIG. 2 is a schematic block diagram of a coexistence system according to another embodiment of the present disclosure.

FIG. 2 is a schematic block diagram showing a coexistence system according to another embodiment of the present disclosure.

As can be seen from FIG. 2, the CE 200 and the CM 300 may be embedded in an AP and a BS, respectively.

Also, the CDIS/CDB 400 may be connected to the TVWS database 600. Through this connection, the CDIS/CDB 400 may receive white space information from the TVWS database 600.

Figure 3:
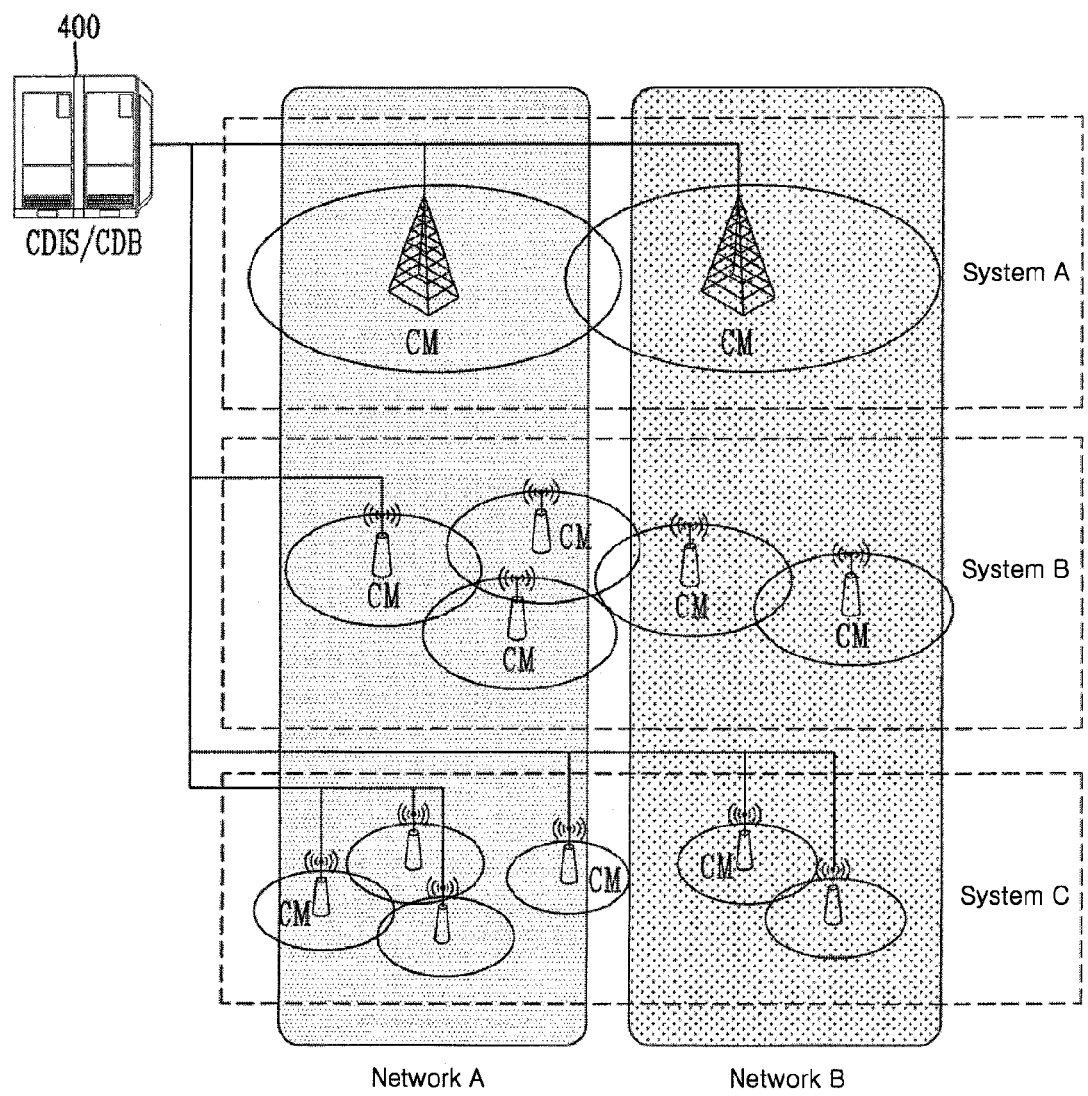
FIG. 3 is a view showing an example of a disposition of the coexistence system according to an embodiment of the present disclosure.

FIG. 3 is a view showing an example of a disposition of the coexistence system according to an embodiment of the present disclosure.

As can be seen from FIG. 3, a network A and a network B exist vertically. Also, a communication system A, a communication system B, and a communication system C exist horizontally. The communication system A, the communication system B, and the communication system C use different wireless access schemes, namely, communication schemes, respectively. For example, the communication system A may be a system such as CDMA, GSM, CDMA-2000, WCDMA, LTE, LTE-Advanced, or IEEE 802.16. The system B may be a cellular system whose cell coverage is smaller than that of the communication system A. Or, the system B may be a system such as Wi-Fi. The system C may be a cellular system, e.g., a femto-cell, whose cell coverage is smaller than that of the system B. The communication system A, the communication system B, and the communication system C has a coexistence manager (CM), respectively.

Meanwhile, the communication system A, the communication system B, and the communication system C geographically coexist within the network A and coexist within the network B. In order for the communication system A, the communication system B, and the communication system C to coexist, the CDIS/CDB 400 may generate a coexistence map and transmit the CM of each of the communication system A, the communication system B, and the communication system C.

Figure 4A:
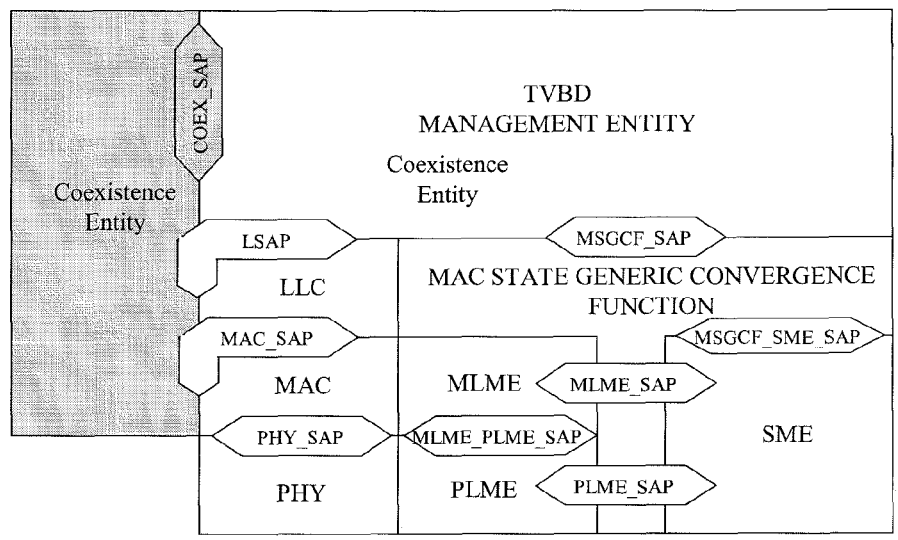
FIGS. 4A and 4B show protocol stacks.
Figure 4B:
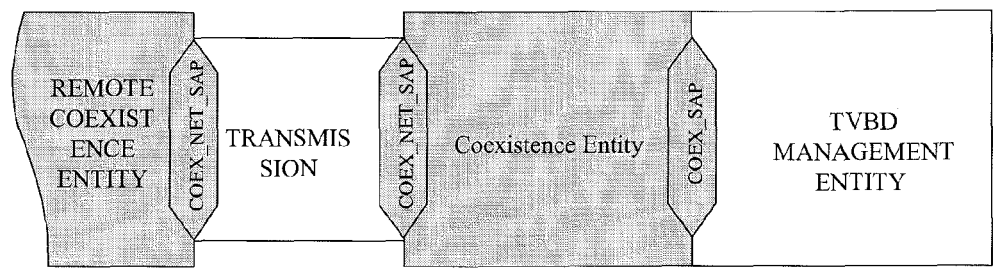

FIGS. 4A and 4B show protocol stacks.

As can be seen with reference to FIGS. 4A and 4B, an existence entity and a TVBD entity are shown. The coexistence entity may be a CE or a CM. The TVBD entity may be a TVBD device.

The coexistence entity uses a service access point (SAP) for interfacing with a different entity.

COEX_SAP: This SAP defines a media independent interface between an existence entity and a TVBD management entity.

COEX_NET_SAP: It defines a media dependent interface of existence entities providing a transmission service in a data plane. This supports exchanging of coexistence information and message with a remote coexistence entity.

The TVBD management entity includes a mapping function with respect to a media dependent SAP primitive from a COEX_SAP primitive.

A coexistence service with respect to IEEE 802.11 in a data frame may be performed by using a primitive defined by a service access point (SAP) of a MAC state generic convergence function (MSGCF) (e.g., MSGCF_SAP) or by using existing primitives defined by LSAP.

Figure 5:
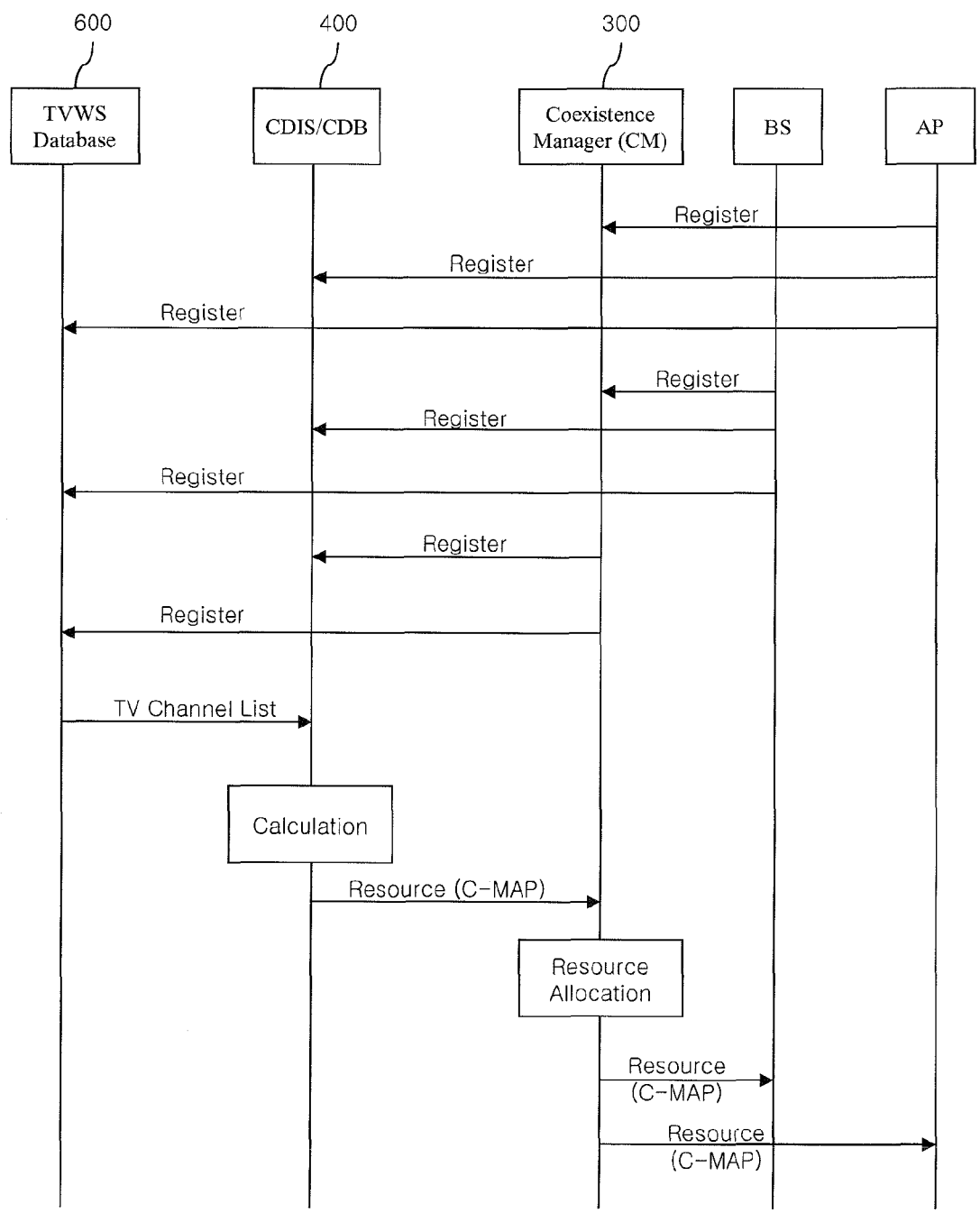
FIG. 5 shows an operation of the coexistence system according to an embodiment of the present disclosure.

FIG. 5 shows an operation of the coexistence system according to an embodiment of the present disclosure.

As can be seen from FIG. 5, it is illustrated that the CM 300 is not installed in an AP and a BS, but this is merely illustrative and the CM 300 may be installed in the AP and the BS. Also, the CE 200 may be installed in the AP and the BS.

Meanwhile, the AP and the BS are registered to the CM 300 and the CDIS/CDB 400, respectively.

The CM also performs registration to the CDIS/CDB 400 and the TVWS database.

Meanwhile, the CDIS/CDB 400 may receive a channel list for a broadcast from the TVWS database 600. The channel list may be frequency information for a broadcast. Also, the channel list may include information regarding an operating channel of a broadcast and a transmit power limitation.

The CDIS/CDB 400 checks whether or not the BS and the AP coexist within a certain area by using location information of the BS and the AP and an available channel information. When the BS and the AP coexist, the CDIS/CDB 400 may calculate a coverage radius of the AP and the BS, allocate channels (or resources) or one or more frequency bands that may be used by the different types of access points, namely, the AP and the BS, located in the certain area based on the channel list, namely, the frequency information for a broadcast, generate the channels (or resources) or information regarding the bands, e.g., a coexistence map, and transmit the same.

Figure 6:
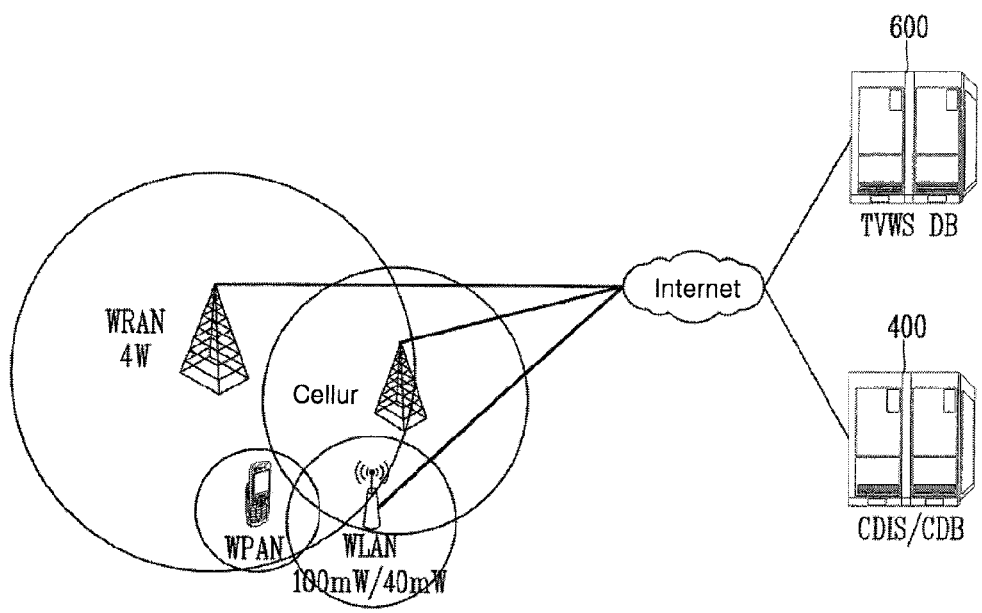
FIG. 6 is a view showing another example of a disposition of the coexistence system according to an embodiment of the present disclosure.

FIG. 6 is a view showing another example of a disposition of the coexistence system according to an embodiment of the present disclosure.

As can be seen from FIG. 6, the CM or the CDIS/CDB 400 may coordinate to allow several APs to coexist in the wireless environment. The several APs may be connected to the CDIS/CDB 400 by using a physical connection such as the Internet.

The CDIS/CDB 400 may acquire channel information for a broadcast from the TVWS database 600 as mentioned above. Also, the CDIS/CDB 400 may acquire channel information, e.g., a broadcast channel set, for a broadcast in a particular geographical area. Also, the CDIS/CDB 400 may calculate a coexistence contour. In particular, the CDIS/CDB 400 may have a neighbor detection function in different systems operating at the TV broadcast white space or a TV broadcast frequency.

Also, as mentioned above, the CDIS/CDB 400 may generate a coexistence white space map or a coexistence map. Also, the CDIS/CDB 400 may provide common clock information. Also, the CDIS/CDB 400 may provide information for time synchronization between different systems.

The CDIS/CDB 400 may provide a parameter with respect to a radio range and an interference range of each apparatus. The CDIS/CDB 400 may provide a parameter with respect to the foregoing coexistence contour. The CDIS/CDB 400 may identify neighbor network apparatuses for the purpose of coexistence between different systems. The CDIS/CDB 400 may provide information regarding transmission power of each network, an antenna height, and any other physical parameters.

Figure 7:
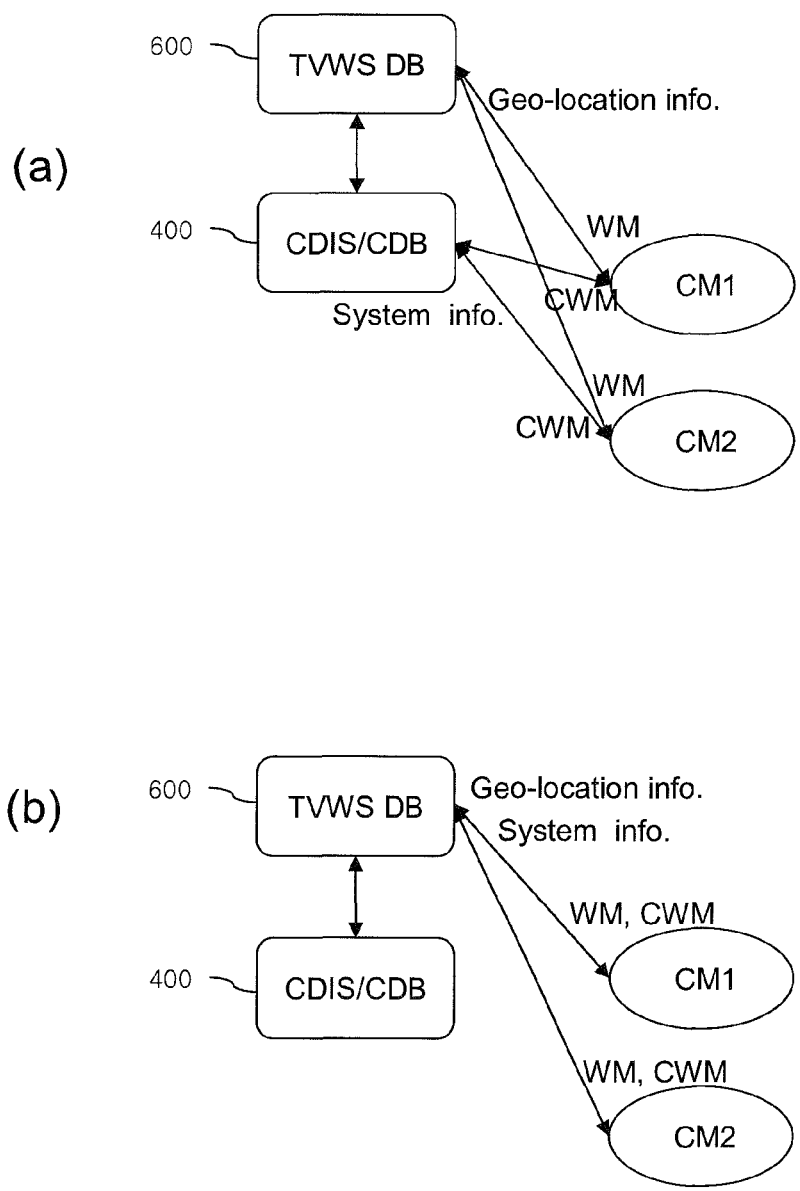
FIGS. 7(a) and 7(b) are views showing an operation of a CDIS/CDB 400.

FIGS. 7(*a*) and 7(*b*) are views showing an operation of a CDIS/CDB 400.

As can be seen from FIG. 7(a), a first CM CM1 and a second CM CM2 exist. The first CM CM1 and the second CM CM2 are connected to the TVWS DB 600 and the CDIS/CDB 400, respectively. The first CM CM1 and the second CM CM2 receive location information and frequency information for a broadcast, e.g., information regarding a whitespace map, from the TVWS DB 600. The whitespace map may refer to information regarding an empty frequency band not used by a broadcast service provider in VHF and UHF frequency bands distributed as TV broadcast bands.

Meanwhile, the CDIS/CDB 400 may be connected to the TVWS DB 600 and receive the frequency information for a broadcast, e.g., the whitespace map, from the TVWS DB 600. As mentioned above, the CDIS/CDB 400 may generate a coexistence whitespace map or a coexistence map based on the frequency information for a broadcast, e.g., the whitespace map. The CDIS/CDB 400 may transfer the generated coexistence whitespace map (CWM) or the coexistence map to the first CM CM1 and the second CM CM2.

Meanwhile, as can be seen from FIG. 7(b), the first CM CM1 and the second CM CM2 are connected to the TVWS DB 600. The TVWS DB 600 may be connected to the CDIS/CDB 400.

The CDIS/CDB 400 may transfer the foregoing CWM or the coexistence map to the TVWS DB 600, and the TVWS DB 600 may transfer the received CWM or the coexistence map to the first CM CM1 and the second CM CM2. In this case, the TVWS DB 600 may transfer the received CWM or the coexistence map under the assumption that it is frequency information for a broadcast, e.g., the whitespace map.

Alternatively, the TVWS DB 600 may transfer the frequency information for a broadcast, e.g., the whitespace map, as well as the received CWM or the coexistence map, to the first CM CM1 and the second CM CM2. In this case, when the first CM CM1 and the second CM CM2 receive the CWM, the coexistence map, and the frequency information for a broadcast, e.g., the whitespace map, the first CM CM1 and the second CM CM2 may select and use appropriate one or more of them.

Figure 8:
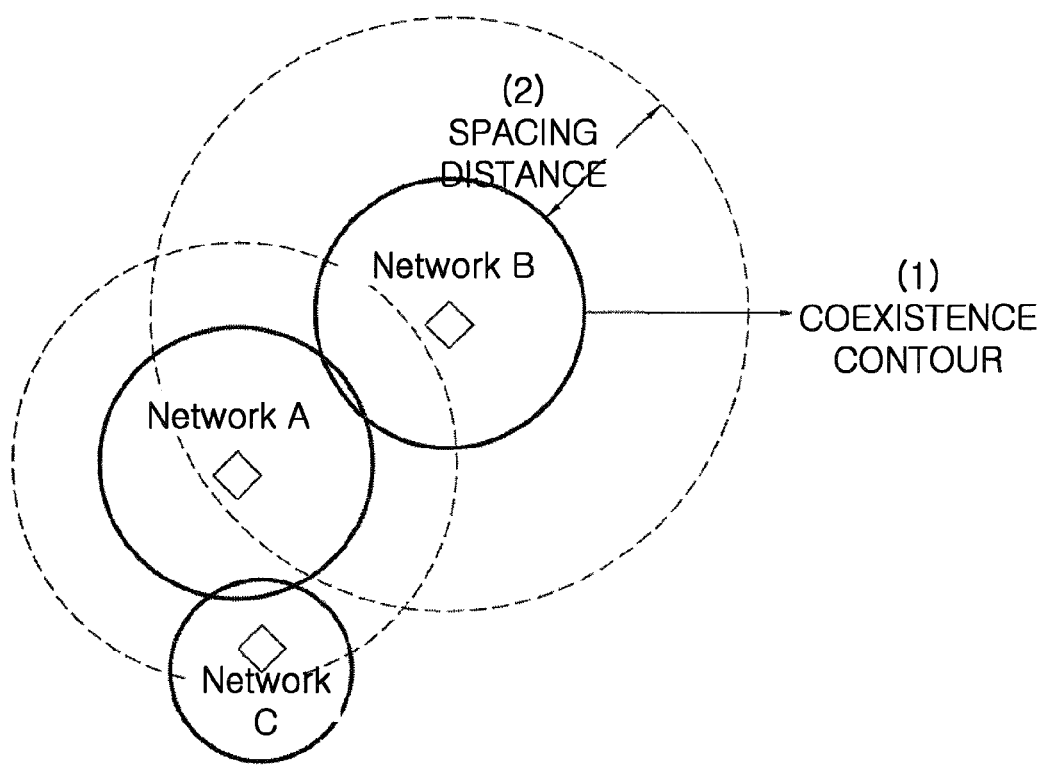
FIG. 8 is a view showing coexistence contours.

FIG. 8 is a view showing coexistence contours.

As can be seen from FIG. 8, the network A, the network B, and the network C exist in proximity. Coexistence contours of the respective networks are illustrated by solid lines and distances between the respective networks are illustrated by dotted lines. The coexistence contours are determined by the characteristics of the respective networks. Meanwhile, the distance between the respective networks may be determined by characteristics with different networks. As can be seen from FIG. 8, the coexistence contours between the network A and the network B are almost in contact, and the coexistence contours between the network A and the network C overlap with each other.

Figure 9:
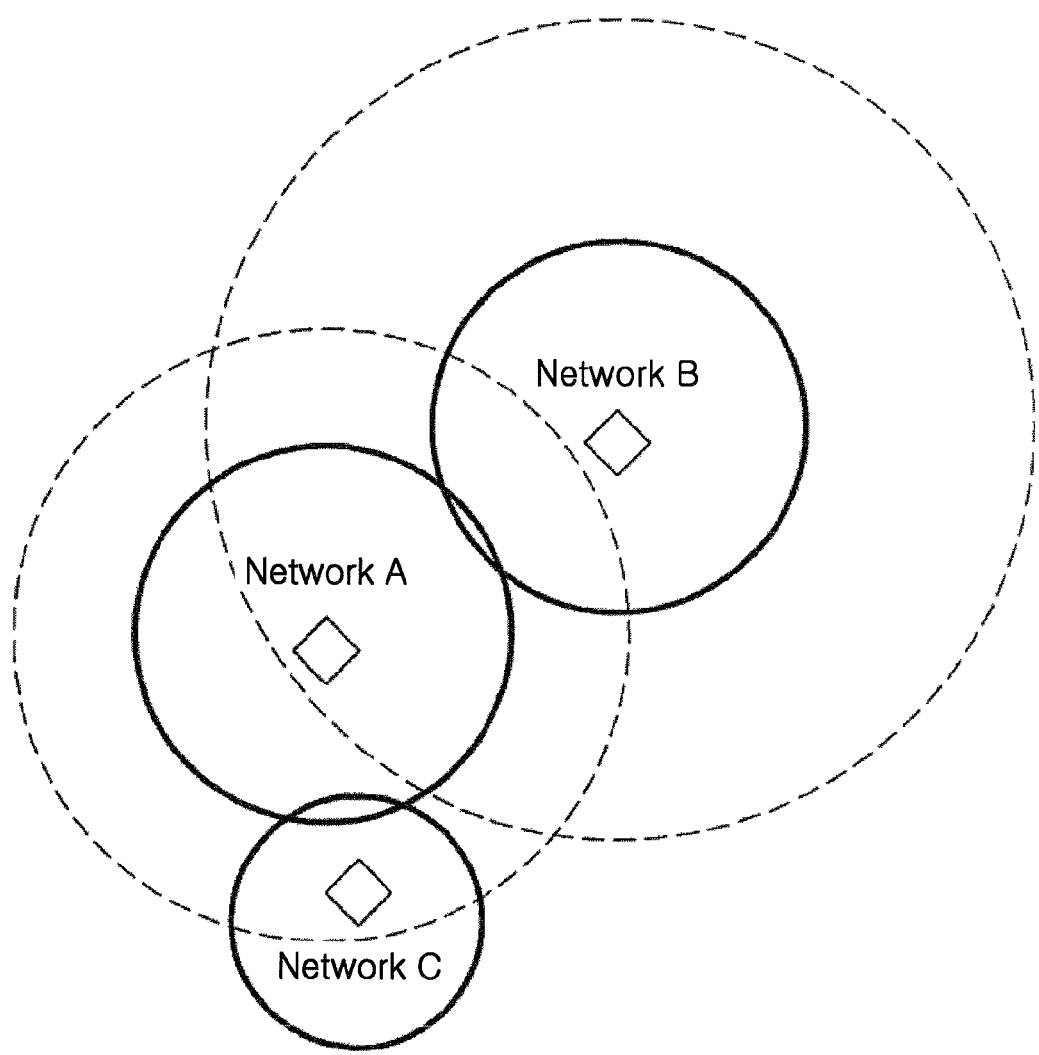
FIG. 9 is a view showing an example of a coexistence whitespace map (CWM) or a coexistence map in the environment of FIG. 8.

FIG. 9 is a view showing an example of a coexistence whitespace map (CWM) or a coexistence map in the environment of FIG. 8.

As shown in a right upper portion of FIG. 9, it is assumed that channels 1 to 6 exist. In this case, it is assumed that channels 1 and 2 are channels used for a broadcast according to the frequency information for a broadcast, e.g., the whitespace map.

The CDIS/CDB 400 transmits the CWM or the coexistence map indicating that the channel 4 is an idle channel to the network A. Accordingly, when the network A determines to use the channel 4, the CDIS/CDB 400 transmits the CWM or the coexistence map indicating that the channel 3, the channel 5, and the channel 6 are idle channels to the network B. Accordingly, when the network B determines to use, for example, the channel 6, the CDIS/CDB 400 may transmit the CWM or the coexistence map indicating that the channel 3 and the channel 5 are idle channels to the network C.

In this manner, the CDIS/CDB 400 transmits the CWM or the coexistence map to the networks A, B, and C, to thus allow the networks A, B, and C to coexist in the wireless environment.

Figure 10:
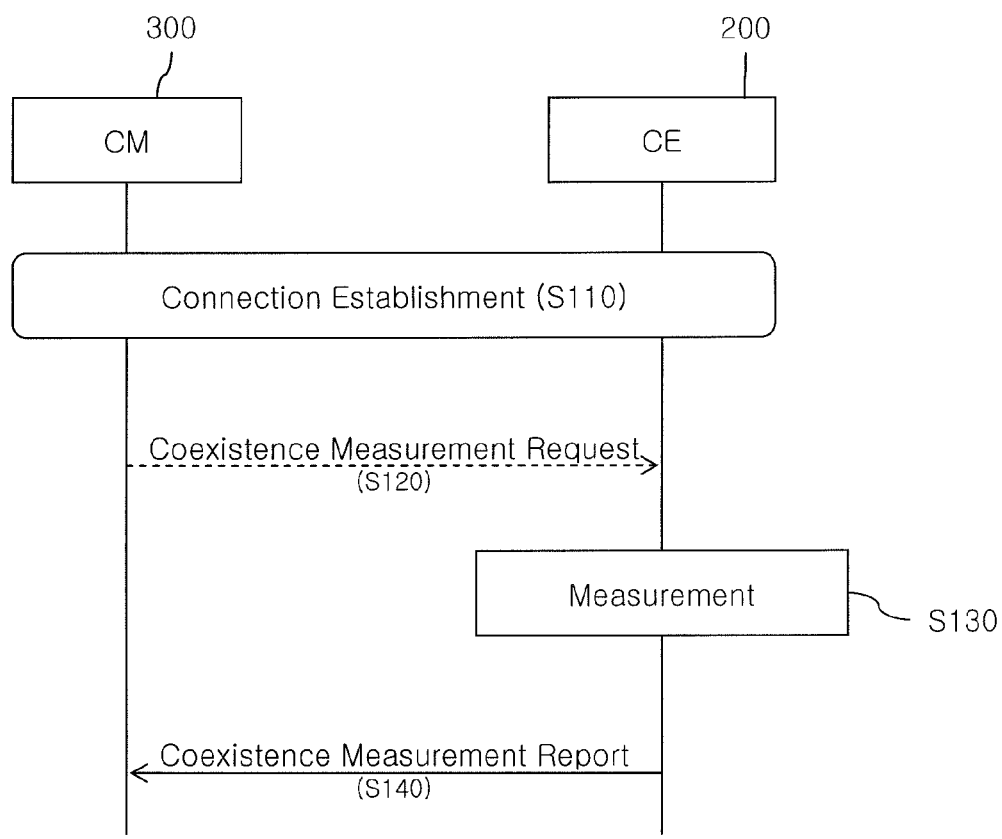
FIG. 10 is a view illustrating a process of receiving measurement information from a coexistence enabler (CE) 200 by a coexistence manager (CM) 300 according to an embodiment disclosed in the present disclosure.

FIG. 10 is a view illustrating a process of receiving measurement information from the coexistence enabler (CE) 200 by the coexistence manager (CM) 300 according to an embodiment disclosed in the present disclosure.

In an embodiment, when a connection is established (e.g., when a state code of a coexistence peer confirm is a success (S110), the CM 300 may request the CE 200 to perform channel measuring in a particular channel list (S120). Such a measurement request frame may include a target channel list to allow for performing monitoring even immediately after a measurement is requested and a time interval during which a measurement is made. The target channel may vary according to a purpose and object of a measurement.

The CM 300 may have (maintain) an available channel list of the TVBD network or device 100 served by the CE 200. The available channel list refers to a TV channel available in a position where the TVBD network or device 100 is registered. The CM 300 may access the TVWS DB 600 to acquire the available channel list of the TVBD network or device 100. Or, the CM 300 may request the CE 200 to receive the available channel list the TVBD network or device 100 periodically acquires according to regulation. Measurement may be performed in an available channel and a non-available channel of the TVBD network or device 100.

In order to determine an operating channel when power is turned or in order to change an operating channel when serious QoS (Quality of Service) is generated in a current operating channel (or when serious QoS as generated is detected in a current operating channel), the TVBD network or device 100 may perform channel measurement. In order to determine a (new) operating channel, the TVBD network or device 100 performs channel measurement in an available channel thereof and calculates a channel load or QoS information, i.e., a degree of available resources in the corresponding channel.

In the coexistence system, the CM 300 determines an operating channel of CEs 200 the CM serves. The CM 300 may arbitrarily distribute and allocate in a TV band or effectively allocate an operating channel by using an interference relationship between TVBD networks or devices 100 served by each CE 200 and the available channel list. The TVBD network or device 100 served by the CE 200 may operate in an intersection region of an operating channel allocated to the CE 200 and an available channel. When the TVBD network or device 100 wants to move to a channel other than the operating channel allocated to the CE 200 from the CM 300, the TVBD network or device 100 cannot independently change the operating channel and an allocation of an operating channel from the CM 300 should be newly changed.

The CM 300 may request the CEs 200 registered thereto to measure a channel load in a particular channel during a certain time interval. This is to collect channel information and effectively allocate resource because the coexistence network is dynamically changed according to TVBD networks or devices 100 that participate in the coexistence system or secede from the coexistence system, varying neighbor networks, and a varying traffic load of the TVBD network or device 100.

The CM 300 determines a channel number whose channel load is to be measured and a measurement time, and transmits a measurement request message to the CE 200. In an embodiment, a measurement request format may be defined as shown in Table 1 below.

TABLE 1

| Information type | Length | Measurement type | Measurement start time | Measurement duration | Channel number |
|---|---|---|---|---|---|
| Octet | 1 | 1 | 2 | 2 | variable |

Information type is discriminated from a different coexistence frame by a coexistence measurement. Measurement type is discriminated from a different measurement by channel load information. Measurement start time is a time at which a requested measurement starts. When the measurement start time is 0, it means that a measurement should be started immediately when a request frame is received. Measurement duration refers to a measurement time interval. Channel number indicates a target channel number. For example, it may be a TVT channel number for performing a measurement or an operating channel of the TVBD network or device 100. In case of 802.11 system, an operating channel of the TVBD network or device 100 may be denoted by a combination of an operating class and a channel number.

Upon receiving a measurement request, the CE 200 measures a channel load in a TV channel indicated by the channel number field (S130), and reports the measurement channel load value to the CDM 300 (S140). A measurement report format may be defined as shown in Table 2 below.

TABLE 2

| Information type | Length | Measurement type | Actual measurement start time | Measurement duration | Channel number | Channel load |
|---|---|---|---|---|---|---|
| Octet | 1 | 1 | 1 | 8 | 2 | 1 | 1 |

Information type is discriminated from a different coexistence frame by a coexistence measurement. Measurement type is discriminated from a different measurement by channel load information. Actual measurement start time is a time at which the TVBD network or device 100 starts a measurement. Measurement duration refers a time interval during which the TVBD network or device 100 actually performs a measurement. Channel number indicates a target channel number actual measured by the TVBD network or device 100. For example, the channel number may be a TVT channel number for performing a measurement or an operating channel of the TVBD network or device 100. In case of 802.11 system, an operating channel of the TVBD network or device 100 may be denoted by a combination of an operating class and a channel number.

Channel load refers to a channel load measured in a TV channel indicated by the channel number field. For example, in the 802.11 system, the channel load may be calculated by a proportion of a busy time measured in a measurement interval. Namely, the channel load may be calculated as shown in Equation 1 below and may have values from 0 to 255.

$$\text{Channel Load} = \text{Integer}\left(\frac{\text{Channel busy time}}{\text{Measurement duration} \times 1024}\right) \times 255 \quad \text{[Equation 1]}$$

Here, without the measurement request from the Cm 300, the TVBD network or device 100 may transmit the channel load to the CM 300 (by using autonomous measurement report). Thus, step 120 in FIG. 9 may be omitted.

The CE 200 performs measurement in the requested channel. When there is no requested channel, the CE 200 may perform a measurement in its own operating channel or in a certain available channel. Here, reported channel load information may include all the information regarding each channel for which a measurement was performed or include information regarding channels desired to be allocated by it according to priority and transmit only a portion thereof. Upon receiving the measurement report from the CE 200, the CM 300 may check channel load information and allocate or re-allocate an operating channel of the CE 200.

In another embodiment, the measurement request frame format may be defined as shown in Table 3.

TABLE 3

| Information element | Coexistence frame header | Information type | Dialog token | Measurement request elements |
|---|---|---|---|---|
| Octet | 8 | 1 | 1 | variable |

A value of the information type field may be set to 3 (measurement request). The measurement request elements field may include one or more measurement request elements. In a single measurement request frame, the number and length of the measurement request elements may be limited by the size of a CXPDU (Coexistence Protocol Data Unit) allowed at the maximum. The measurement request elements may include a request for performing a designated measurement operation of the TVBD network or device 100 receiving a measurement request.

The measurement request element format may be defined as shown in Table 4 below.

TABLE 4

| Information element | length | Measurement type | Measurement request |
|---|---|---|---|
| Octet | 1 | 1 | variable |

The measurement type field may be defined as shown in Table 5 below.

TABLE 5

| Measurement type | Description |
|---|---|
| 0 | Reserved |
| 1 | TVBD Detection |
| 2 | Primary User Detection |
| 3-7 | Reserved |

The measurement type in the measurement request element may indicate TVBD detection. The measurement request field corresponding to the TVBD detection element may be defined as shown in Table 6 below.

TABLE 6

| Information Element | Measurement Start Time | Measurement Duration | TV channel numbers |
|---|---|---|---|
| octet | 2 | 2 | Variable |

The measurement start time field is set to a time at which a requested measurement starts. A value of 0 indicates that a requested measurement starts immediately. The measurement duration field is set to a duration of a requested measurement expressed by time units (TUs). The TV channel numbers indicate a TV channel number to which a measurement request is applied. The channel number may be defined to be different in each country or area.

Meanwhile, in the measurement request element, the measurement type may indicate a primary user detection request. The measurement request field corresponding to a primary user detection element may be defined as shown in Table 7 below.

TABLE 7

| Information Element | Measurement Start Time | Measurement Duration | Spectrum Sensing Threshold | TV channel numbers |
|---|---|---|---|---|
| octet | 2 | 2 | 2 | Variable |

The measurement start time field is set to a time at which a requested measurement starts. A value of 0 indicates that a requested measurement starts immediately. The measurement duration field is set to a duration of a requested measurement expressed by time units (TUs). A spectrum sensing threshold value indicates an energy detection threshold value for detecting a primary user, which is expressed by dBm. The TV channel numbers indicate a TV channel number to which a measurement request is applied. The channel number may be defined to be different in each country or area.

Also, the measurement report frame format may be defined as shown in Table 8 below.

TABLE 8

| Information element | Coexistence frame header | Information type | Dialog token | Measurement report element |
|---|---|---|---|---|
| octet | 8 | 1 | 1 | variable |

A value of the information type field of the measurement report may be set to 4. The measurement report elements field may include one or more measurement report elements. In a single measurement report frame, the number and length of measurement report elements may be limited by the size of CXPDU allowed at the maximum.

The measurement report elements format may be defined as shown in Table 9 below.

TABLE 9

| Information element | Length | Measurement type | Measurement report |
|---|---|---|---|
| octet | 1 | 1 | variable |

The measurement type field may be defined as shown in Table 5 above.

In the measurement request element, the measurement type may indicate TVBD detection. The measurement report field corresponding to the TCBD detection element may be defined as shown in Table 10 below.

TABLE 10

| Information Element | Actual Measurement Start Time | Measurement Duration | Measuring TVBD Address | TVBD Detection Report Subelement |
|---|---|---|---|---|
| octet | 8 | 2 | 6 | Variable |

The actual measurement start time field is set to a time at which a TVBD measurement starts. The measurement duration field is set to a duration during which a TVBD report expressed by time units (TUs) is measured. The measuring TVBD address is set to a MAC address of a TVBD which has actually performed a measurement. The TVBD detection report subelement field may be repeated.

The TVBD detection report subelement indicates a detected TVBD. The TVBD detection report subelement may be defined as shown in Table 11 below.

TABLE 11

| Information element | Subelement ID | Length | Detected TVBD Address | Detected TVBD Device Type | RCPI | CE Identifier of detected TVBD | Channel Numbers |
|---|---|---|---|---|---|---|---|
| Octet | 1 | 1 | 6 | 1 | 1 | 6 | Variable |

The detected TVBD address is set to a MAC address of the TVBD network or device 100 detected from a measured channel. The detected TVBD device type field may be defined as shown in Table 12 below.

TABLE 12

| Device type | Description |
|---|---|
| 0 | Reserved |
| 1 | Fixed device |
| 2 | Persona/Portable device |
| 3-7 | Reserved |

RCPI indicates received channel power by a dBm scale. A CE identifier of a detected TVBD is set to a unique identifier of the CE 200. The CE 200 may exist in the detected TVBD network or device 100 or in a TVBD network or device 100 serving the detected TVBD network or device 100. The channel numbers may be set to a channel number on which the TVBD network or device 100 actually performs a measurement. The channel numbers may be matched to a value of a channel numbers field of a corresponding TVBD request.

In the measurement request element, the measurement type may indicate primary user detection. The measurement report field corresponding to the primary user detection element may be defined as shown in Table 13 below.

TABLE 13

| Information Element | Actual Measurement Start Time | Measurement Duration | Length | Channel Number | Primary User Type | Received Power |
|---|---|---|---|---|---|---|
| octet | 8 | 2 | 1 | 1 | 1 | 1 |

The actual measurement start time field is set to a time at which a TVBD measurement starts. The measurement duration field is set to a duration during which a TVBD report expressed by time units (TUs) is measured. The channel number may be matched to a value of a channel numbers field of a corresponding TVBD request.

The primary user type field is a detected primary user and may be defined as shown in Table 14 below.

TABLE 14

| Device type | Description |
|---|---|
| 0 | Reserved |
| 1 | TV Signal |
| 2 | Low Power Auxiliary |
| 3-7 | Reserved |

Received power indicates power received from a detected incumbent user by dBm.

FIG. 11(a) is a view illustrating semantics of a primitive of a coexistence measurement request according to an embodiment disclosed in the present disclosure.

COEX_measurement.request is used by a coexistence user to acquire measurement information. A parameter of COEX_measurement.request is defined as shown in Table 15 below.

TABLE 15

| Name | Data type | Description |
|---|---|---|
| DestinationIdentifier | COEX_ID | This identifies a local coexistence entity or remote coexistence entity to be a destination of the request |
| ChannelNumber | Integer | It designates a channel number to be measured |

COEX_measurement.request is generated by a coexistence user in order to acquire measurement information from a local coexistence entity or a remote coexistence entity. When a destination of a request is the local coexistence entity itself, the local coexistence entity responds by COEX_Measurement.confirm. When a destination of a request is the remote coexistence entity, the local coexistence entity may generate a corresponding measurement request message with respect to the remote coexistence entity.

FIG. 11(b) is a view illustrating semantics of a primitive of a coexistence measurement notification according to an embodiment disclosed in the present disclosure.

COEX_Measurement.indication is used by a coexistence entity in order to inform a coexistence user about a reception of a measurement request message from a peer coexistence entity. A parameter of COEX_Measurement.indication may be defined as shown in Table 16 below.

TABLE 16

| Name | Data type | Description |
|---|---|---|
| SourceIdentifier | COEX_ID | This identifies a caller of a primitive that may become a local COEX entity or a remote COEX entity |
| ChannelNumber | Integer | It designates a channel number to be measured |

It is used by a coexistence entity in order to inform a coexistence user when COEX_Measurement.request message is received. When the indication is received, the coexistence user may respond by COEX_measurement.reponse primitive.

FIG. 11(c) is a view illustrating semantics of a primitive of a coexistence measurement response according to an embodiment disclosed in the present disclosure.

COEX_measurement.response is used by a coexistence user in order to transfer local measurement information to a coexistence user who has called a measurement request. A parameter of COEX_Measurement.response is defined as shown in Table 17 below.

TABLE 17

| Name | Data type | Description |
|---|---|---|
| DestinationIdentifier | COEX_ID | This identifies a remote COEX entity to be a destination of this response |
| ResultCode | Enumeration | It reports result of request |
| MeasurementReportSet | Each is a set of measurement reports defined in measurement report element | Each is a set of measurement reports including an address of the TVBD network or device 100, an identifier of the CE 200 of a detected TVBD network or device 100, a channel number, an actual measurement start time, and a duration time |

It is used by a coexistence user in response to received COEX_Measurement.indication. When a response is received, the existence entity may generate a corresponding COEX_Measurement.report message and transmit it to a destination coexistence entity.

FIG. 11(d) is a view illustrating semantics of a primitive of a coexistence measurement confirmation according to an embodiment disclosed in the present disclosure.

COEX_Measurement.confirm is used by a coexistence entity to transfer service change information (measurement information) to a coexistence user who has called a COEX_Measurement.request. A parameter of COEXMeasurement.confirm is defined as shown in Table 18 below.

TABLE 18

| Name | Data type | Description |
|---|---|---|
| SourceIdentifier | COEX_ID | This identifiers a caller of this primitive that may |

TABLE 18-continued

| Name | Data type | Description |
| --- | --- | --- |
| ResultCode | Enumeration | become a local COEX entity or a remote COEX entity It reports result of request |
| MeasurementReportSet | Each is a set of measurement reports defined in measurement report element | Each is a set of measurement reports including an address of the TVBD network or device 100, an identifier of the CE 200 of a detected TVBD network or device 100, a channel number, an actual measurement start time, and a duration time |

It is called by a local coexistence entity in order to transfer the result of COEX_Measurement.request primitive from a previous coexistence user. When the coexistence user receives the primitive, the coexistence user performs an appropriate determination and appropriate operation. However, when ResutsCode does not indicate 'Success', the receiver performs appropriate error handling.

Figure 12:
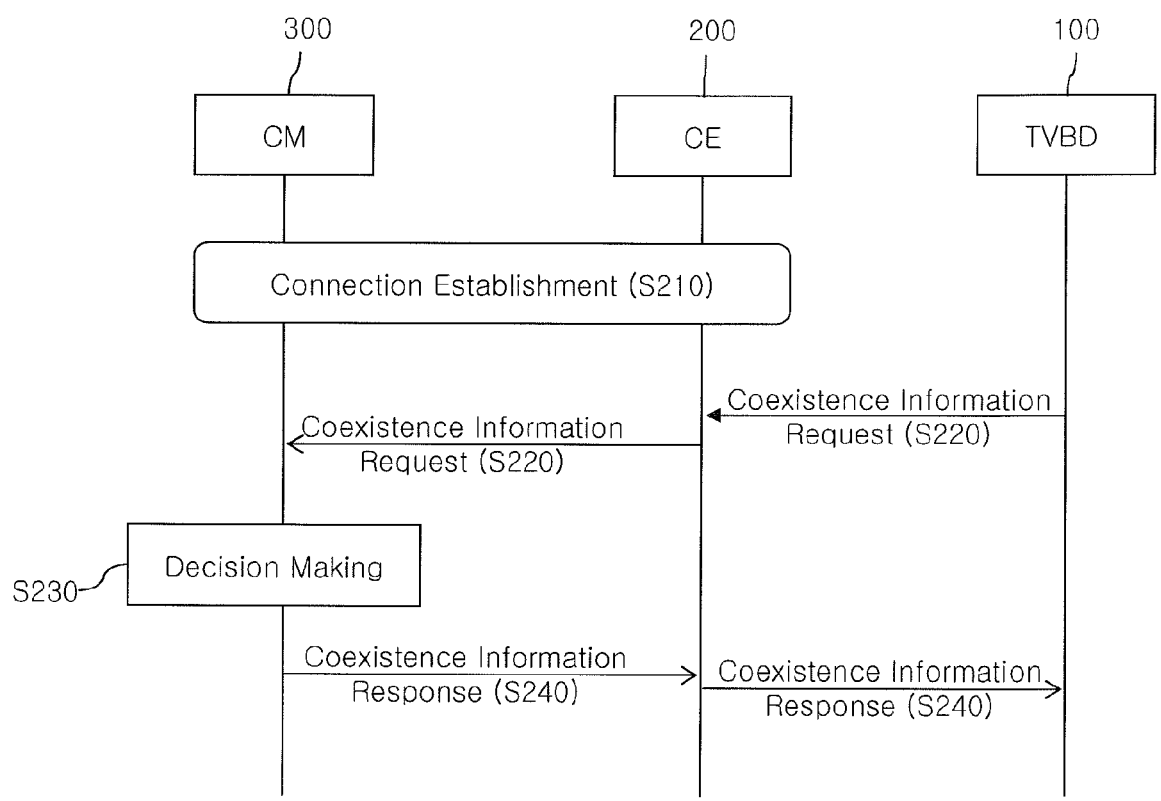
FIG. 12 is a view illustrating a process of requesting and receiving coexistence information from the CM 300 by the CE 200 according to another embodiment disclosed in the present disclosure.

FIG. 12 is a view illustrating a process of requesting and receiving coexistence information from the CM 300 by the CE 200 according to another embodiment disclosed in the present disclosure.

In an embodiment, when power is turned on and a connection is established (e.g., when a state code of coexistence peer conform is 'SUCCESS' (S210), the TVBD network or device 100 transmits a coexistence information request message to the CE 200 after it is successfully registered to the CM 300 or as a neighboring network environment is changed, and the CE 200 transmits it to the CM 300 (S220). The coexistence information request message serves to request an allocation of an operating channel from the CM 300, and here, the TVBD network or device 100 also transmits its available channel list and a channel load of an available channel together. The available channel list transmitted in the coexistence information request may be the same as an available channel list acquired by the TVBD network or device 100 from the TVWS DB 600 or a subset thereof. A coexistence information request message format may be defined as shown in Table 19 below.

TABLE 19

| Information type | Length | TVBD device type | Registered location | Channel number | Maximum power level | Channel load |
| --- | --- | --- | --- | --- | --- | --- |
| Octet | 1 | 1 | 1 | 15 | 1 | 1 | 1 |

The information type is discriminated from a different coexistence frame by coexistence information. The TVBD device type and the registered location are information indicating information about the TVBD network or device 100 served by the CE 200 to the CM 300. The TVBD device type may be defined as shown in Table 20 below.

TABLE 20

| Device type | Description |
| --- | --- |
| 0 | Reserved |
| 2 | Fixed device |
| 3 | Persona/portable device |
| 4-7 | reserved |

The registered location, which is location information of TVBD indicated by 3D coordinates, has a format as shown in Table 21 below.

TABLE 21

| | Latitude resolution | Latitude fraction | Latitude integer | Longitude resolution | Longitude fraction | Longitude integer | Altitude type | Altitude resolution | Altitude fraction | Altitude integer |
| --- | --- | --- | --- | --- | --- | --- | --- | --- | --- | --- |
| octet | 6 | 25 | 9 | 6 | 25 | 9 | 4 | 6 | 8 | 22 |

The channel number, the maximum power level and the channel load fields indicate information regarding an available channel of the TVBD network or device 100, which may be repeated according to the number of channels.

The channel number may be a channel number indicated in an available channel list acquired from the TVWS DB 600, which indicates a TV band that may be used by the TVBD network or device 100. The channel number may be a TV channel number on which a measurement was performed, or an operating channel of the TVBD network or device 100. In case of 802.11 system, an operating channel of the TVBD network or device 100 may be denoted by a combination of an operating class and a channel number.

The maximum power level is a maximum transmission power value corresponding to a channel indicated in the available channel acquired from the TVWS DB 600.

The channel load is a channel load measured by the TVBD network or device 100 in a TV channel indicated by the channel number field.

Upon receiving the coexistence information request, the CM 300 allocates the operating channel in consideration of an available channel number of each TVBD network or device 100, TVBD maximum transmission power corresponding to each channel, and a channel load (S230). The CM 300 includes information regarding an operating channel allocated to each CE 200 in a coexistence information response message and transmits the same to the CE 200 (S240), and the CE transmits it to the TVBD. The coexistence information response message format may be defined as shown in Table 22 below.

TABLE 22

| Information type | Length | Channel number | Maximum power level |
| --- | --- | --- | --- |
| Octet | 1 | 1 | 1 |

The information type is discriminated from a different coexistence frame by coexistence information.

The channel number is a number of an operating channel allocated by the CM 300 to the CE 200, and the CE 200 may select a desired channel from a corresponding channel number and use it. The operating channel may be a subset of an available channel list. The channel number may be a TV channel number of an operating channel of a TVBD. In case of 802.11 system, the operating channel of TVBD may be denoted by a combination of an operating class and a channel number.

The maximum power level refers to maximum power level limited in the operating channel allocated by the CM 300 to the CE 200.

The channel load may have various forms that may indicate resource availability of a corresponding channel. For example, the channel load may be indicated by a proportion of a busy time or an idle time measured in a measurement section of a corresponding channel, estimated throughput estimated from an interference level from a different user who uses the corresponding channel, or the like.

After the CM acquires the channel load, when the CM 300 determines an operating channel of the TVBD network or device 100, the CM 300 checks a channel load measured by the TVBD network or device 100, and performs channel allocation preferentially by a channel having the smallest channel load. The channel load may strengthen the weak point of the interference relationship between TVBD networks or devices calculated only by a geo-location and a device type (the problem of acquiring a neighbor set among TVBD networks or devices), and considerably reduce signaling and computation overhead accompanied in performing an optimum operating channel allocation when the CM 300 manages every information including measurement information. By using the channel load, information regarding preference with respect to an operating channel based on channel information actually measured by the TVBD network or device 100 is provided to the Cm 300, whereby overhead with respect to a channel allocation by the CM 300 can be considerably reduced.

In another embodiment, the coexistence information request frame is defined as shown in Table 23 below.

TABLE 23

|  | Coexistence frame header | Information type | Dialog token | Coexistence information request element |
| --- | --- | --- | --- | --- |
| Octet | 8 | 1 | 1 | Variable |

The information type field is set to 5 in order to indicate a coexistence information request frame. A format of the coexistence information request element is defined as shown in Table 24 below.

TABLE 24

|  | Length | Information type | Information request |
| --- | --- | --- | --- |
| Octet | 1 | 1 | variable |

The information type field is defined as shown in Table 25 below.

TABLE 25

| Information type | Description |
| --- | --- |
| 0 | Reserved |
| 1 | Operation control |
| 2-7 | Reserved |

The information type may indicate operation control information. The information request field corresponding to an operation control information element is defined as shown in Table 26 below.

TABLE 26

|  | Length | TVBD device type | Registered location | Channel number | Maximum power level |
| --- | --- | --- | --- | --- | --- |
| Octet | 1 | 1 | 15 | 1 | 1 |

The length is a variable value set with respect to a repetition number n of the channel number and the maximum power level fields. The repetition number n is set as a number of available channels acquired from the TVWS DB 600.

The TVBDD device type is set as a type of a TVBD device defined in Table 12 as described above. The registered location field format is defined by Table 21 as described above. The registered location information field includes longitude, latitude, and altitude information.

The channel number is set as a TV channel number of an available channel list most recently acquired from the TVWS DB 600. The maximum power level is a signed number and has a length of 1 octet. The maximum power level indicates maximum transmission power that can be transmitted on a channel indicated by the channel number by dBm. The channel number field and the maximum power level field are repeated.

The coexistence information response frame is defined as shown in Table 27 below.

TABLE 27

|  | Information | Information type | Dialog token | Coexistence information response elements |
| --- | --- | --- | --- | --- |
| Octet | 8 | 1 | 1 | variable |

The information type field is set to 6 in order to indicate a coexistence information response frame. A format of the coexistence information response element is defined as shown in Table 28 below.

TABLE 28

|  | Length | Information type | Information response |
| --- | --- | --- | --- |
| Octet | 1 | 1 | variable |

The information type field is defined as shown in Table 25 above.

The information type may indicate operation control information. The information response field corresponding to an operation control information element is defined as shown in Table 29 below.

TABLE 29

|  | Length | Channel number | Maximum power level |
| --- | --- | --- | --- |
| Octet | 1 | 1 |  |

The length is a variable value set for a repetition number n of the channel number and the maximum power level fields. The channel number is set to a TV channel number by which the CE 200 may be operable.

The maximum power level is a signed number and has a length of 1 octet. The maximum power level indicates maximum power that can be transmitted on a channel indicated by the channel number field by dBm. The channel number field and the maximum power level field are repeated.

Figure 13:
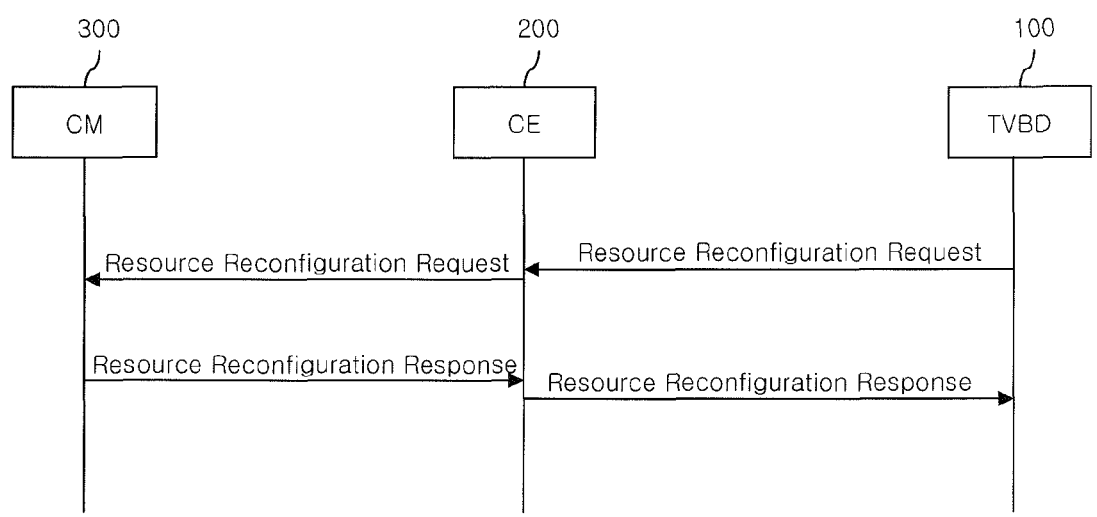
FIG. 13 is a view illustrating a resource reconfiguration procedure.

FIG. 13 is a view illustrating a resource reconfiguration procedure.

As can be seen from FIG. 13, the TVBD device 100 transmits a resource reconfiguration message to the CE 200. The resource reconfiguration message may include information regarding the TVBD device 100. The information may include an available channel list.

The CE 200 may transmit the resource reconfiguration message to the CM 300. A source identifier of the resource reconfiguration message is set by an ID of the CE 200, and a destination identifier is set by an ID of the CM 300. The resource reconfiguration message may be set as shown in Table 30 below.

TABLE 30

| Information element | Data type | Description |
|---|---|---|
| TVBD Type | TVBD_TYPE | TVBD device or network type |
| Gelocation | GEO_LOC | Registered location |
| Channel Number | Integer optional | Channel number |
| Start Freq | Real optional | Start frequency |
| endFreq | Real optional | End frequency |
| Maximum Power Level | Real | Power limitation |
| Channel Load | Real optional | Anticipated performance |

The CM 300 may allocate resource in response to a reception of the resource reconfiguration message. And, the CM 300 may transmit a reconfiguration response message including information regarding the allocated resource to the CE 200. The resource reconfiguration message is used to allocate resource. The resource reconfiguration message may be configured as shown in Table 31 below.

TABLE 31

| Information element | Data type | Description |
|---|---|---|
| Channel Number | Integer optional | Channel number |
| Start Freq | Real optional | Start frequency |
| End Freq | Real optional | End frequency |
| Maximum Power Level | Real | Power limitation |

The channel number includes information regarding allocated resource, namely, channel. The power limitation indicates a limitation of transmission power in the allocated channel.

Figure 14:
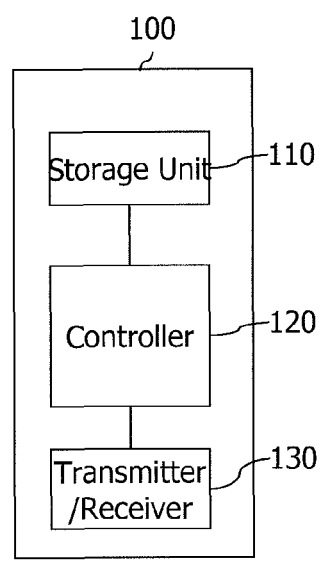
FIG. 14 is a block diagram of a TVBD network or device 100 disclosed in the present disclosure.

FIG. 14 is a block diagram of a TVBD network or device 100 disclosed in the present disclosure.

As shown in FIG. 14, the TVBD network or device 100 includes a storage unit 110, a controller 120, and a transceiver unit 130.

The storage unit 110 stores the method according to the embodiments illustrated in FIGS. 1 to 13.

The controller 120 controls the storage unit 110 and the transceiver unit 130. In detail, the controller 120 executes the foregoing methods stored in the storage unit 310. The controller 320 transmits the foregoing signals through the transceiver unit 130.

Figure 15:
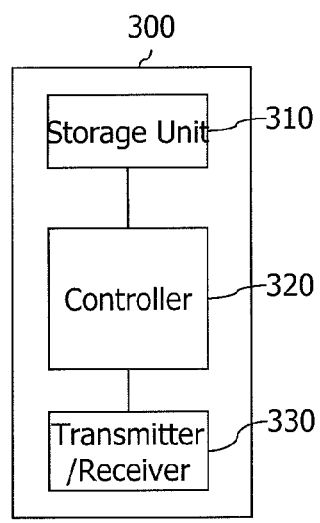
FIG. 15 is a block diagram of the CM 300 disclosed in the present disclosure.

FIG. 15 is a schematic block diagram of the CM 300 according to the present disclosure.

As shown in FIG. 15, the CM 300 includes a storage unit 310, a controller 320, and a transceiver unit 330.

The storage unit 310 stores the method according to the embodiments illustrated in FIGS. 1 to 13.

The controller 320 controls the storage unit 310 and the transceiver unit 330. In detail, the controller 320 executes the foregoing methods stored in the storage unit 310. The controller 320 transmits the foregoing signals through the transceiver unit 330.

While the present invention has been shown and described in connection with the embodiments, it will be apparent to those skilled in the art that modifications and variations can be made without departing from the spirit and scope of the invention as defined by the appended claims.

The invention claimed is:

1. A method for obtaining a measurement report, the method comprising:
    transmitting, from an apparatus including a coexistence manager (CM) to a coexistence enabler (CE), a measurement request message for obtaining a measurement report from one or more devices using television (TV) bands,
    wherein the measurement request message includes a measurement type field indicating what type of measurement is requested among plural types of measurements,
    wherein the plural types of measurements include a first type for a detection of a device using TV bands, and a second type for a channel load measurement, and
    wherein the measurement request message further includes a start frequency, an end frequency, one or more channel numbers, and a scheduled measurement time;
    receiving, by the apparatus from the CE, a first measurement confirmation message to confirm reception of the measurement request;
    receiving, by the apparatus from the CE, a measurement response message including the measurement report, after the scheduled measurement time,
    wherein the measurement report includes at least one of a result of the detection of the device using TV bands and a result of the channel load measurement;
    receiving, by the apparatus from the CE, a resource reconfiguration request message including information regarding a type of the device, registered geographical location, maximum power level, and channel load; and
    transmitting, from the apparatus to the CE, a resource reconfiguration response message including information on an allocated resource and maximum power level.

2. The method of claim 1, further comprising:
    transmitting, from the apparatus to the CE, a second measurement confirmation message to confirm a reception of the measurement report.

3. The method of claim 1, wherein the measurement report is used to make a decision related to coexistence.

4. The method of claim 1, wherein the CM performs at least one of:
    generating a coexistence white space map;
    making a decision for coexistence for the one or more devices; and
    exchanging information required for the coexistence.

5. The method of claim 1, wherein the one or more devices use different types of network technologies.

6. The method of claim 1, wherein the scheduled measurement time includes at least one of a measurement start time indicating when to start the measurement and a measurement duration.

7. A method for transmitting a measurement report, the method comprising:
    receiving, by an apparatus including a coexistence enabler (CE) and from a coexistence manager (CM), a measurement request message for obtaining a measurement report from one or more devices using television (TV) bands, wherein the measurement request message includes a measurement type field indicating what type of measurement is requested among plural types of measurements, wherein the plural types of measurements include a first type for a detection of a device using the TV bands, and a second type for a channel load measurement, and wherein the measurement request message further includes a start frequency, an end frequency, one or more channel numbers, and a scheduled measurement time;

receiving, from the apparatus via the CM, a first measurement confirmation message to confirm reception of the measurement request;

transmitting, from the apparatus to the CM, a measurement response message including the measurement report after the scheduled measurement time, wherein the measurement report includes at least one of a result of the detection of the device using TV bands and a result of the channel load measurement transmitting, from the apparatus to the CM, a resource reconfiguration request message including information regarding a type of the device, registered geographical location, maximum power level, and channel load; and receiving, by the apparatus from the CM, a resource reconfiguration response message including information on an allocated resource and maximum power level.

8. The method of claim 7, further comprising:

receiving, from the CM, a second measurement confirmation message to confirm a reception of the measurement report.

9. The method of claim 7, wherein the measurement report is used to make a decision for coexistence.

10. The method of claim 7, wherein the CM performs at least one of:

generating a coexistence white space map;

making a decision for coexistence for the one or more devices; and exchanging information required for the coexistence.

11. The method of claim 7, wherein the scheduled measurement time includes at least one of a measurement start time indicating when to start the measurement and a measurement duration.

* * * * *